United States Patent
Bulan et al.

(10) Patent No.: US 10,068,146 B2
(45) Date of Patent: Sep. 4, 2018

(54) METHOD AND SYSTEM FOR DETECTION-BASED SEGMENTATION-FREE LICENSE PLATE RECOGNITION

(71) Applicant: Xerox Corporation, Norwalk, CT (US)

(72) Inventors: Orhan Bulan, Webster, NY (US); Palghat Ramesh, Pittsford, NY (US); Vladimir Kozitsky, Rochester, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 123 days.

(21) Appl. No.: 15/052,941

(22) Filed: Feb. 25, 2016

(65) Prior Publication Data
US 2017/0249524 A1    Aug. 31, 2017

(51) Int. Cl.
*G06K 9/32* (2006.01)
*G06K 9/62* (2006.01)

(52) U.S. Cl.
CPC ........... *G06K 9/325* (2013.01); *G06K 9/3208* (2013.01); *G06K 9/6265* (2013.01); *G06K 9/6297* (2013.01); *G06K 2209/15* (2013.01)

(58) Field of Classification Search
CPC .... G06K 9/325; G06K 9/6265; G06K 9/6297; G06K 9/3208; G06K 2209/15
See application file for complete search history.

(56) References Cited

U.S. PATENT DOCUMENTS

| | | | |
|---|---|---|---|
| 5,809,166 A * | 9/1998 | Huang | G06K 9/342 |
| | | | 382/174 |
| 6,473,517 B1 | 10/2002 | Tyan et al. | |
| 6,553,131 B1 | 4/2003 | Neubauer et al. | |
| 6,982,654 B2 | 1/2006 | Rau et al. | |
| 7,711,150 B2 | 5/2010 | Simon | |
| 7,881,498 B2 | 2/2011 | Simon | |
| 8,009,870 B2 | 8/2011 | Simon | |
| 8,447,112 B2 | 5/2013 | Paul et al. | |
| 8,483,440 B2 | 7/2013 | Fan et al. | |
| 8,693,733 B1 | 4/2014 | Harrison | |
| 8,768,009 B1 | 7/2014 | Smith | |

(Continued)

OTHER PUBLICATIONS

Einsele, Farshideh, Rolf Ingold, and Jean Hennebert. "A HMM-based approach to recognize ultra low resolution anti-aliased words." Pattern Recognition and Machine Intelligence (2007): 511-518.*

(Continued)

*Primary Examiner* — Carol Wang
(74) *Attorney, Agent, or Firm* — Kermit D. Lopez; Luis M. Ortiz; Ortiz & Lopez, PLLC

(57) ABSTRACT

A detection-based segmentation-free method and system for license plate recognition. An image of a vehicle is initially captured utilizing an image-capturing unit. A license plate region is located in the image of the vehicle. A set of characters can then be detected in the license plate region and a geometry correction performed based on a location of the set of characters detected in the license plate region. An operation for sweeping an OCR across the license plate region can be performed to infer characters with respect to the set of characters and locations of the characters utilizing a hidden Markov model and leveraging anchored digit/character locations.

9 Claims, 8 Drawing Sheets

(56) References Cited

U.S. PATENT DOCUMENTS

| | | |
|---|---|---|
| 8,781,172 B2 | 7/2014 | Kozitsky et al. |
| 8,792,682 B2 | 7/2014 | Fan et al. |
| 8,953,846 B2 | 2/2015 | Wu et al. |
| 9,020,200 B2 | 4/2015 | Fan et al. |
| 9,031,948 B1 | 5/2015 | Smith |
| 9,042,647 B2 | 5/2015 | Kozitsky et al. |
| 9,082,038 B2 | 7/2015 | Kozitsky et al. |
| 9,092,979 B2 | 7/2015 | Burry et al. |
| 9,122,953 B2 | 9/2015 | Fillion et al. |
| 9,224,058 B2 | 12/2015 | Paul et al. |
| 9,239,955 B2 | 1/2016 | Bhanu et al. |
| 9,418,305 B1* | 8/2016 | Ramesh .............. G06K 9/3258 |
| 9,501,708 B1* | 11/2016 | Ahmad .............. G06K 9/00879 |
| 2002/0051575 A1* | 5/2002 | Myers .............. G06K 9/3258 382/202 |
| 2005/0180632 A1* | 8/2005 | Aradhye .............. G06K 9/3283 382/182 |
| 2006/0123051 A1* | 6/2006 | Hofman .............. G06K 9/3258 |
| 2006/0251339 A1* | 11/2006 | Gokturk .............. G06F 17/30253 382/305 |
| 2009/0208060 A1 | 8/2009 | Want et al. |
| 2010/0008581 A1* | 1/2010 | Bressan .............. G06K 9/00859 382/177 |
| 2010/0128985 A1* | 5/2010 | El-Sana .............. G06K 9/00402 382/189 |
| 2010/0246963 A1* | 9/2010 | Al-Muhtaseb ....... G06K 9/6297 382/185 |
| 2012/0155712 A1 | 6/2012 | Paul et al. |
| 2012/0263352 A1 | 10/2012 | Fan et al. |
| 2013/0088597 A1 | 4/2013 | Kadoch et al. |
| 2013/0204719 A1 | 8/2013 | Burry et al. |
| 2013/0279758 A1* | 10/2013 | Burry .............. G06K 9/3258 382/105 |
| 2013/0294653 A1 | 11/2013 | Burry et al. |
| 2014/0301606 A1 | 10/2014 | Paul et al. |
| 2014/0307924 A1 | 10/2014 | Fillion et al. |
| 2014/0355836 A1 | 12/2014 | Kozitsky et al. |
| 2014/0363052 A1 | 12/2014 | Kozitsky et al. |
| 2015/0294175 A1 | 10/2015 | Bala et al. |
| 2016/0034773 A1* | 2/2016 | Goncalves .............. G06K 9/18 382/103 |
| 2017/0017854 A1* | 1/2017 | You .............. G06K 9/6297 |

OTHER PUBLICATIONS

Guillevic, Didier, and Ching Y. Suen. "HMM word recognition engine." In Document Analysis and Recognition, 1997., Proceedings of the Fourth International Conference on, vol. 2, pp. 544-547. IEEE, 1997.*

Schenkel, Markus, and M. Jabri. "Low resolution, degraded document recognition using neural networks and hidden Markov models." Pattern Recognition Letters 19, No. 3 (1998): 365-371.*

Peng, Xujun, Huaigu Cao, Srirangaraj Setlur, Venu Govindaraju, and Prem Natarajan. "Multilingual OCR research and applications: an overview." In Proceedings of the 4th International Workshop on Multilingual OCR, p. 1. ACM, 2013.*

Elagouni, Khaoula, Christophe Garcia, Franck Mamalet, and Pascale Sébillot. "Text recognition in multimedia documents: a study of two neural-based ocrs using and avoiding character segmentation." International Journal on Document Analysis and Recognition (IJDAR) 17, No. 1 (2014): 19-31.*

Howe, Nicholas R., Shaolei Feng, and R. Manmatha. "Finding words in alphabet soup: Inference on freeform character recognition for historical scripts." Pattern Recognition 42, No. 12 (2009): 3338-3347.*

Mahmoud, Sabri a., and Sameh M. Awaida. "Recognition of off-line handwritten Arabic (Indian) numerals using multi-scale features and support vector machines vs. hidden markov models." The Arabian Journal for Science and Engineering 34, No. 2B (2009): 429-444.*

Coetzee, Charl, Charl Botha, and David Weber. "PC based number plate recognition system." In Industrial Electronics, 1998. Proceedings. ISIE'98. IEEE International Symposium on, vol. 2, pp. 605-610. IEEE, 1998.*

U.S. Appl. No. 14/699,289, filed Apr. 29, 2015, Ramesh et al.

Du, S. et al., "Automatic License Plate Recognition (ALPR):A State-of-the-Art Review," IEEE Transactions on Circuits and Systems for Video Technology (2013) 23(2):311-325.

* cited by examiner

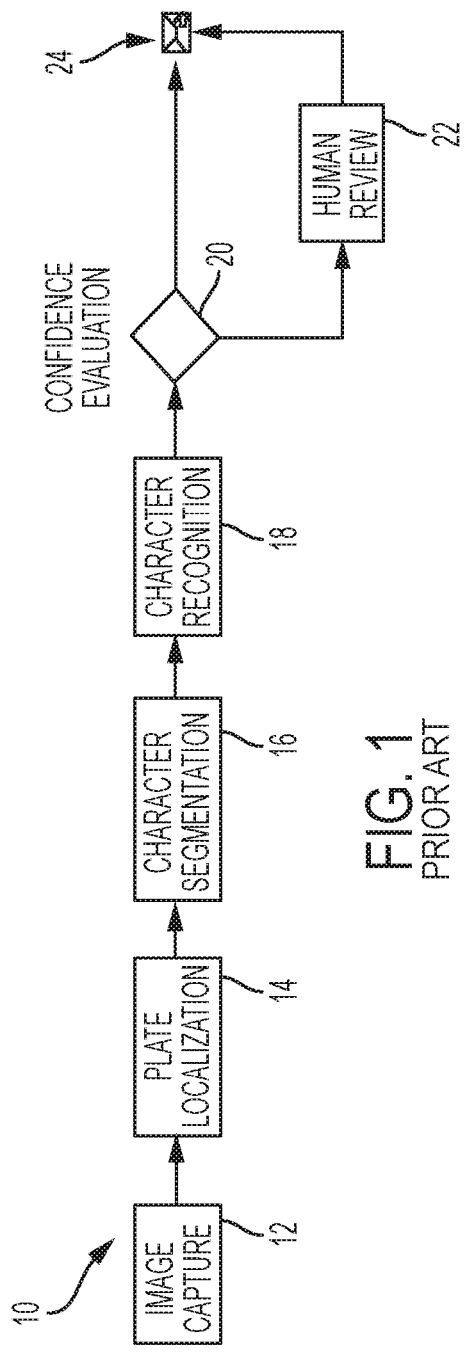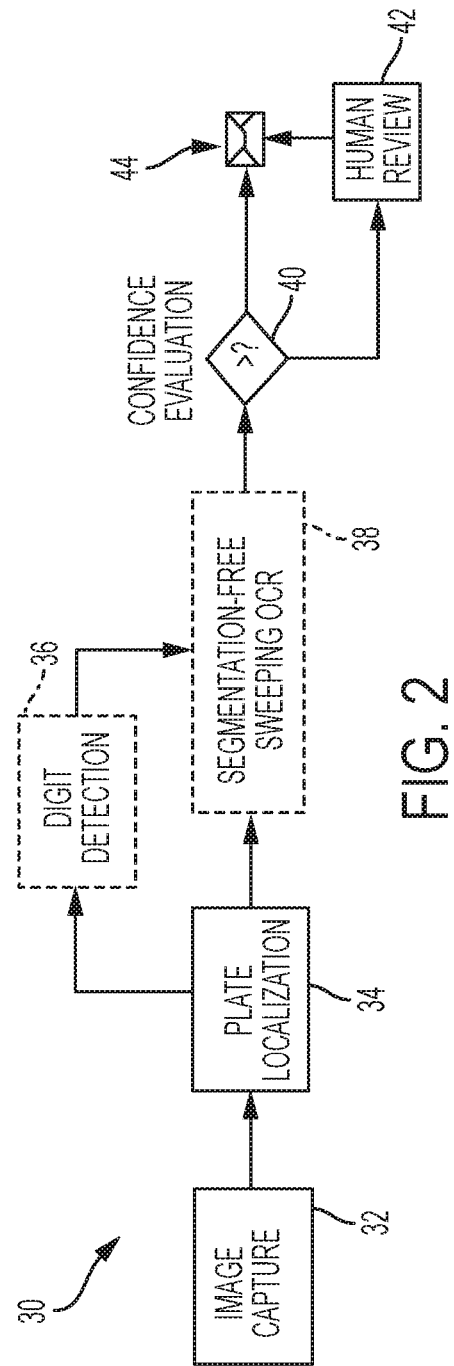

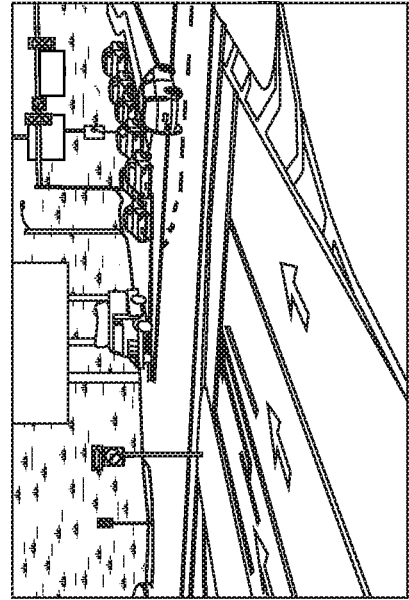
A) FIRST EVIDENTIARY IMAGE (SHOT A)
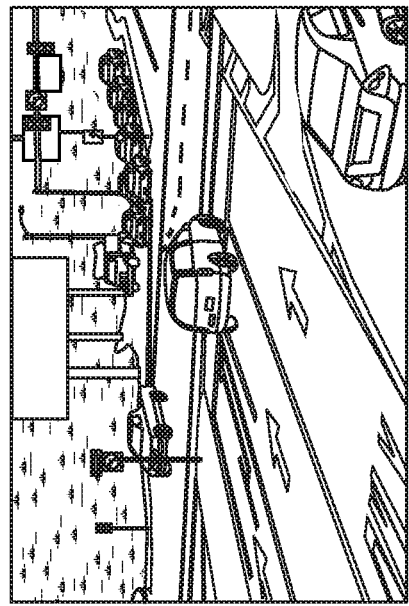
B) SECOND EVIDENTIARY IMAGE (SHOT B)
FIG. 3
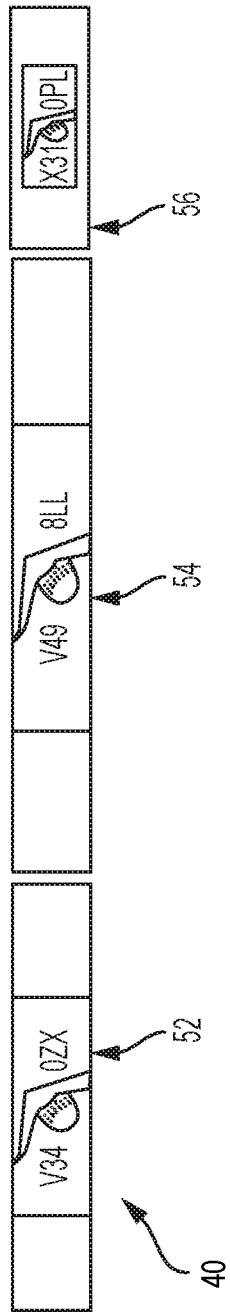
FIG. 4

METHOD AND SYSTEM FOR DETECTION-BASED SEGMENTATION-FREE LICENSE PLATE RECOGNITION

TECHNICAL FIELD

Embodiments are generally related to image processing methods and systems. Embodiments also relate to ALPR (Automated License Plate Recognition) technologies.

BACKGROUND OF THE INVENTION

ALPR systems are employed in a variety of traffic surveillance applications, including toll monitoring, parking management, and the detection of different types of traffic violation. FIG. 1 illustrates a high-level block diagram of a prior art ALPR system 10. ALPR systems such as the example system 10 depicted in FIG. 1 typically has four stages 12, 14, 16, and 18. In the first stage 12, an image of a vehicle can be captured while the vehicle is moving (e.g., passing a toll booth). In the image acquisition stage 12, typically near infrared cameras are utilized to capture vehicle images both day and night time under low lighting conditions. In the second stage (i.e., plate localization) 14, the captured vehicle image is processed to localize the license plate region in the image. A number of different methods can be utilized for license plate localization.

After localizing the plate region in the image, the characters are segmented and extracted in the third stage 16 (i.e., character segmentation). In the final stage (i.e., character recognition) 18, the segmented character images can be recognized using an OCR (Optical Character Recognition) engine trained in an offline phase. A confidence evaluation operation 20 can be implemented after completion of the fourth stage 18. The OCR engine typically outputs a confidence score for each of the segmented character from which an overall confidence score is calculated for the entire plate. If the overall confidence score is higher than a pre-defined threshold as shown by decision operation 20, the recognized license plate number is directly passed to the rest of the processing pipeline without a human interruption. When the confidence score is less than the threshold, the license plate image first goes to a manual human review process 22 to avoid the serious public relations problem of issuing improper citations.

Though being a mature technology, the challenge with ALPR systems such as system 10 depicted in FIG. 1 is scalability and minimizing human intervention in the presence of challenging noise sources present in license plate images captured under realistic conditions (i.e., field deployed solutions). These include: heavy shadows, non-uniform illumination (from one vehicle to the next, daytime versus nighttime, etc.), challenging optical geometries (tilt, shear, or projective distortions), plate frames and/or stickers partially touching characters, partial occlusion of characters (e.g., trailer hitch ball), poor contrast, and general image noise (e.g., salt and pepper noise). For ALPR systems deployed in the USA, variation between states in character font, width, and spacing further add to the difficulty of proper character segmentation.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing methods and systems.

It is another aspect of the disclosed embodiments to provide for an improved ALPR (Automated License Plate Recognition) method and system.

It is yet another aspect of the disclosed embodiments to provide for a detection-based segmentation-free license plate, recognition method and system.

The aforementioned aspects and other objectives and advantages can now be achieved as described herein. Detection-based segmentation-free methods and systems for license plate recognition are disclosed. An image of a vehicle is initially captured utilizing an image-capturing unit. A license plate region can be located in the image of the vehicle. A set of characters can then be detected in the license plate region and a geometry correction can be performed based on a location of the set of characters detected in the license plate region. An operation for sweeping an OCR across the license plate region can be performed to infer characters with respect to the set of characters and locations of the characters utilizing a hidden Markov model and leveraging anchored digit/character locations.

In an example embodiment, a detection-based segmentation-free Automatic License Plate Recognition (APLR) method and/or system can be implemented for minimizing human intervention in the loop and improved performance in challenging states where the baseline segmentation based method experiences significant failures due to the logo image behind license plate characters. The method performs digit detection and geometry correction and provides metrics to an OCR (Optical Character Recognition) algorithm that enables higher recognition confidence for difficult regions.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a high-level block diagram depicting an overview and components of a prior art ALPR system;

FIG. 2 illustrates a high-level block diagram of an ALPR system, which can be implemented in accordance with an example embodiment;

FIG. 3 illustrates sample images captured by a red light enforcement system, in accordance with an example embodiment;

FIG. 4 illustrates sample localized license plate images, in accordance with an example embodiment;

DETAILED DESCRIPTION

Figure 5:
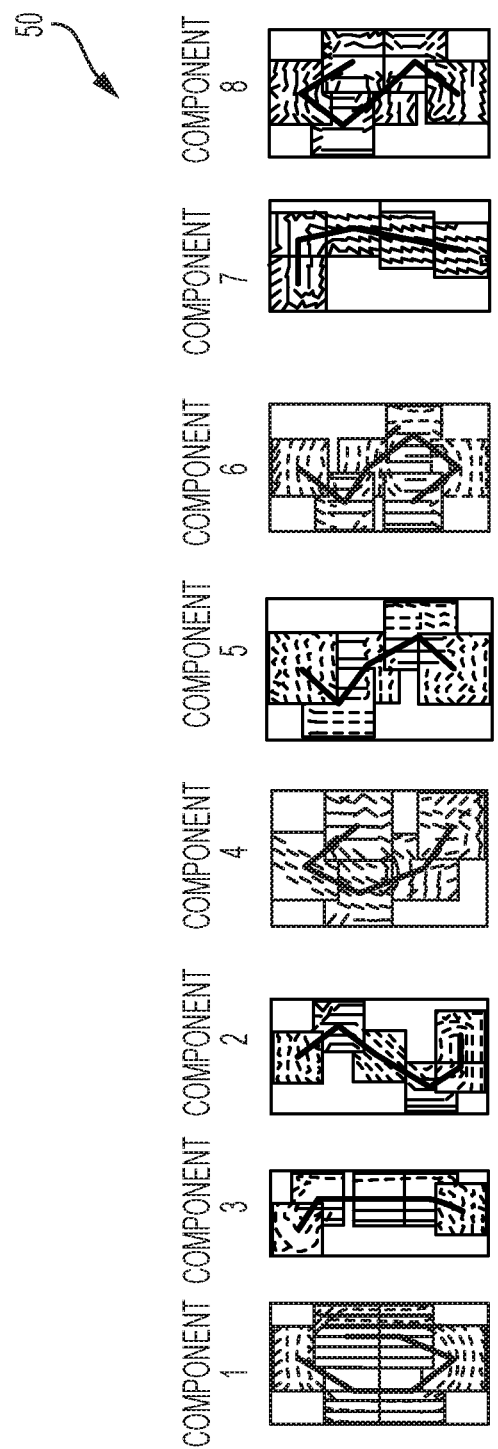
FIG. 5 illustrates trained DPM models for digits, in accordance with an example embodiment.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as in a pattern of physical light or a collection of data representing the physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is considered to be in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, where each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

FIG. 2 illustrates a high-level block diagram of an ALPR system 30, which can be implemented in accordance with an example embodiment. The ALPR system 30 depicted in FIG. 2 includes a number of stages or modules including, for example, an image acquisition module 32, a plate localization module 34, a digit detection module 36, a segmentation-free sweeping OCR module 38, and a confidence evaluation module 40. The ALPR system 30 implements a detection-based segmentation-free ALPR approach for minimizing human intervention in the loop and improving performance in challenging jurisdictions where a baseline ALPR approach fails significantly due to the logo in-between and overlapping with the characters that makes it difficult for projective segmentation.

The image acquisition module 32 can thus capture one or more images of a vehicle. The plate localization module 34 can locate a license plate in the captured images. The digit detection module 36 detects a small set of characters in the localized plate region (e.g., digit detection). The segmentation-free sweeping OCR module 38 sweeps an OCR across the plate region to infer characters and their locations utilizing an HMM (Hidden Markov Model) and leveraging anchored digit/character locations from the previous modules 34 and/or 36. A geometry corrected operation based on the location of the detected characters (or digits) can also be facilitated by the segmentation-free sweeping OCR module 38. Note that an HMM is a statistical Markov model in which the system being modeled is assumed to be a Markov process with unobserved (hidden) states. An HMM can be presented as the simplest dynamic Bayesian network.

Vehicle images can be captured from highways or expressways utilizing commercially available RGB cameras, which are directed towards the license plate of an incoming vehicle. If night vision is desired, cameras with NIR capabilities coupled with an external illuminator can also be used. Alternatively, the images captured by existing red light enforcement cameras, other tolling cameras, speed detection cameras, or the like can be processed to implement the ALPR system 30.

FIG. 3 illustrates sample images 46 and 48 captured by a red light enforcement system, in accordance with an example embodiment. Image 46 is a first evidentiary image depicting a vehicle passing through an intersection with a traffic light already red. Image 48 is a second evidentiary image depicting the vehicle having passed through the red light. A key challenge for ALPR systems is the accurate localization of license plate on the captured image/video frame such as shown in images 46 and 48. The evidentiary images 46 and 48 captured by an example red light enforcement system demonstrates that when a violation is detected, the license plate of the violating vehicle is required to be located and identified for a fully automated system.

Most existing techniques operate by first finding the busy areas on the image plane and then localizing the license plate by identifying the text regions on the detected busy areas. These existing techniques can locate license plates in images captured in controlled settings, wherein the primary purpose of the camera is to capture the license plate of a vehicle (e.g., tolling). So the camera in such cases is configured accordingly to capture the license plate of the vehicle clearly. There are also settings/applications where the automated license plate detection is only a secondary concern of the camera and hence, the camera may not be configured for license plate detection (e.g., red light enforcement cameras, automated parking billing). A license plate may be required to be detected in cluttered scenes in such applications.

FIG. 4 illustrates a group 40 of localized license plate images 52, 54, 56, in accordance with an example embodiment. FIG. 5 illustrates a group of images 50 demonstrating sample trained DPM models for digits, in accordance with an example embodiment. The majority of plate codes in many different jurisdictions use combinations of letters and digits as shown in FIG. 4. This fact can be exploited to implement an approach to first detect digits in localized license plate images as there are only 10 digits compared to over 30 letters possibly be utilized in a license plate. For this purpose, an appearance-based model can be trained to detect and locate digits in a given license plate image. It can be appreciated, however, that the disclosed embodiments are not limited to such features. That is, this is not restrictive. The models can be trained for any sub-set of characters. Alternatively, such models can be trained for the whole character set. This may not be desired in some cases, however, because this requires more computation and training time.

Note that some digits appear very similar to each other such as 3 and 8 so eight models can be trained for 10 digits to reduce some of the burden in training. As part of training each model, several landmarks can be manually located in positive samples to model the appearance of digits. The images depicted in FIG. 5 demonstrate located landmarks that can be implemented in such a model. The number of landmark points can be adjusted based on the amount of unique features to be included. For example, for detecting faces in different poses in an image, more than 30 landmark points are needed in order to include unique facial features such as nose and eyes. In digit localization, the edges are mostly straight lines or curves. Hence, there is less benefit to include many landmark points.

Too many landmark points can significantly increase the amount of manual work in the training phase and computational cost in the on-line application. Because the relationships between landmark points are processed through dynamic programming, the end points of the sequence of points cannot be connected. The choice of where to position the end points can potentially affect the performance and thus must be done with care. Also note that in some experimental embodiments, only eight mixtures were used to develop the model, but ten mixtures (i.e., one for each digit) can also be used to capture all different digits. It can be appreciated, of course that this is just an example embodiment and that the number and location of the selected landmarks are not restrictive.

Once the set of landmark points and their relative locations within the window are determined, the landmark points can be labeled manually in a set of training images. Negative samples were areas other than the located landmarks in the scene. The training process then constructs a model by learning the appearance at each of the landmark points and the relationship between points as shown in FIG. 5.

Figure 6:
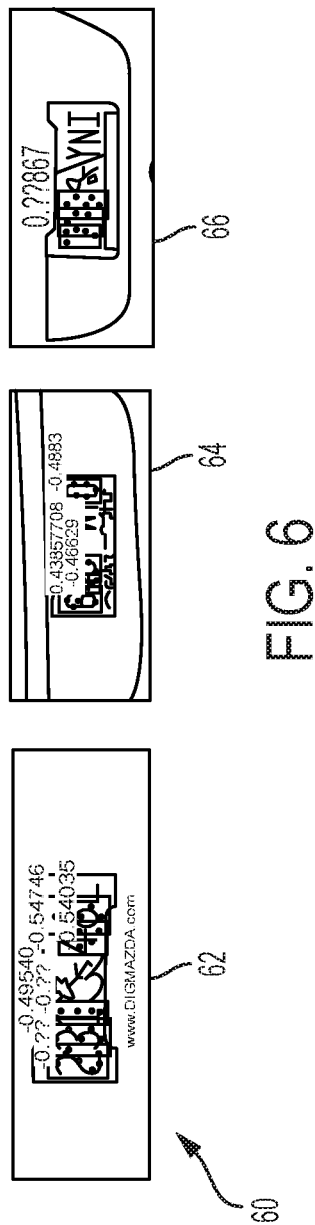
FIG. 6 illustrates detected digits in a license plate image utilizing the models depicted in FIG. 5, in accordance with an example embodiment.

FIG. 6 illustrates detected digits in example license plate images 62, 64, 66 utilizing the models depicted in FIG. 5, in accordance with an example embodiment. After locating the license plate, digits can be detected utilizing the 8-mixture model in the localized license plate image as shown in FIG. 6. The output of this module will be the detected locations of the digits. At times the model also locates characters that are similar in appearance to digits. Characters such as 'B', 'D', and 'Z' are sometimes located. The detection and localization of multiple license plate characters allows for correction of plate alignment and vertical cropping excluding non-text content. Effective vertical cropping enables improved OCR.

Figure 7:
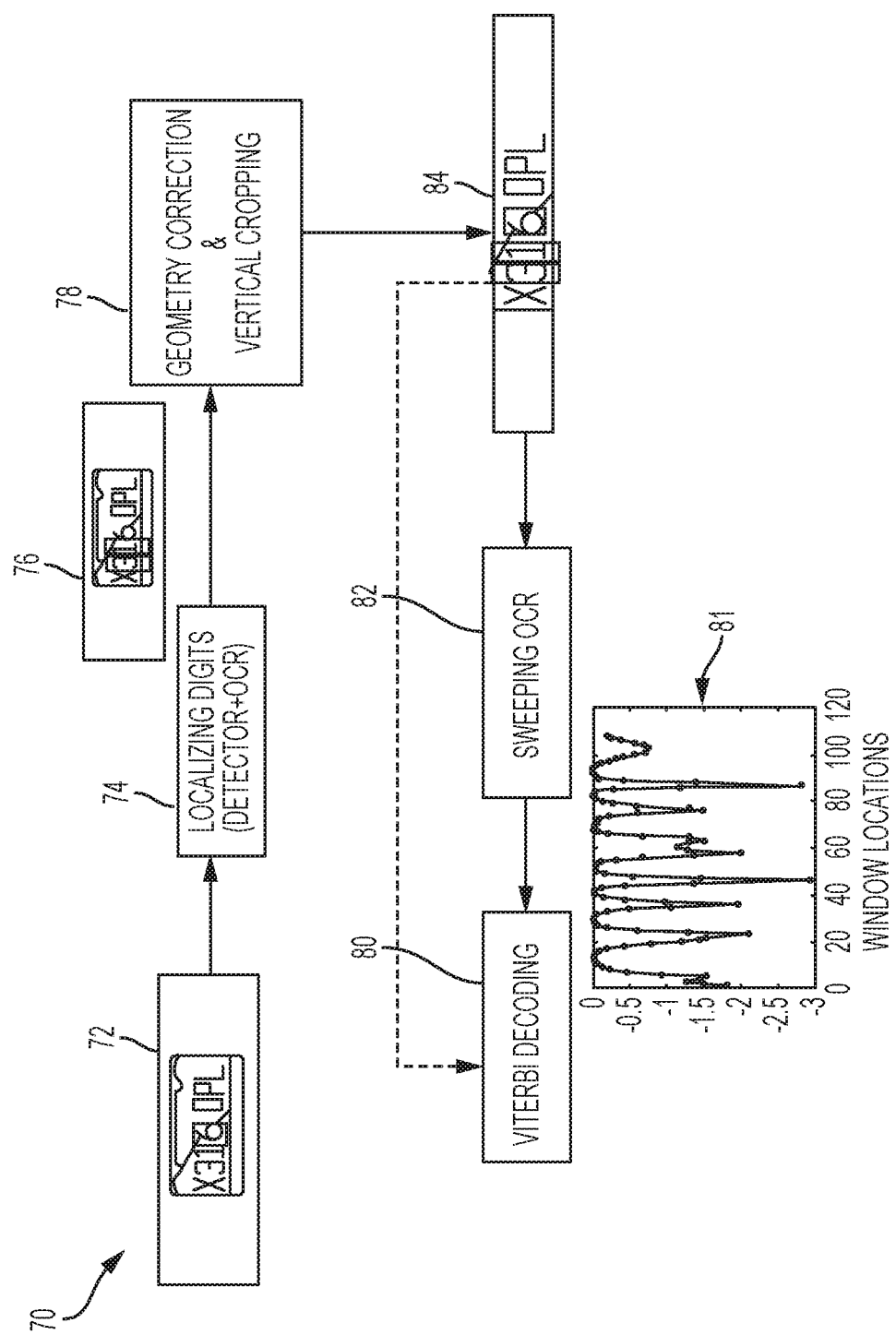
FIG. 7 illustrates a method for the location of detected digits anchored in segmentation-free OCR, in accordance with an example embodiment.

FIG. 7 illustrates a method for the location of detected digits anchored in segmentation-free OCR, in accordance with an example embodiment. In some embodiments, a method for segmentation-free OCR can be implemented utilizing, for example, HMM, Viterbi decoding, and a language model for a State code. The novelty in the disclosed module is the use of detected digit locations in the Viterbi decoding to leverage character location in the HMM framework. A modified Viterbi decoding algorithm that uses the anchor points for a subset of character locations in the plate has been developed. Anchoring digit locations in the sweeping OCR process not only assists in identifying spacing between characters, but also improves the decoding performance in several cases. This is illustrated in FIG. 7. Note that as utilized herein, the term Viterbi generally refers to a Viterbi algorithm, which is a dynamic programming algorithm that can be utilized to determine the most likely sequence of hidden state (i.e., the Viterbi path), which can result in a sequence of observed events especially in the context of Markov information sources and hidden Markov models.

The method 70 shown in FIG. 7 thus includes a step or operation for localizing digits (i.e., detector plus OCR) as shown at block 74 with respect to a license plate image 72. The resulting license plate image 76 is then subject to an operation, as illustrated at block 78, involving geometry correction and vertical cropping. The resulting image 84 can then be subject to a sweeping OCR operation as shown at block 82 followed by a Viterbi decoding operation, as depicted at block 80. The image of a graph 81 indicates window locations with respect to the processed image.

Figure 8:
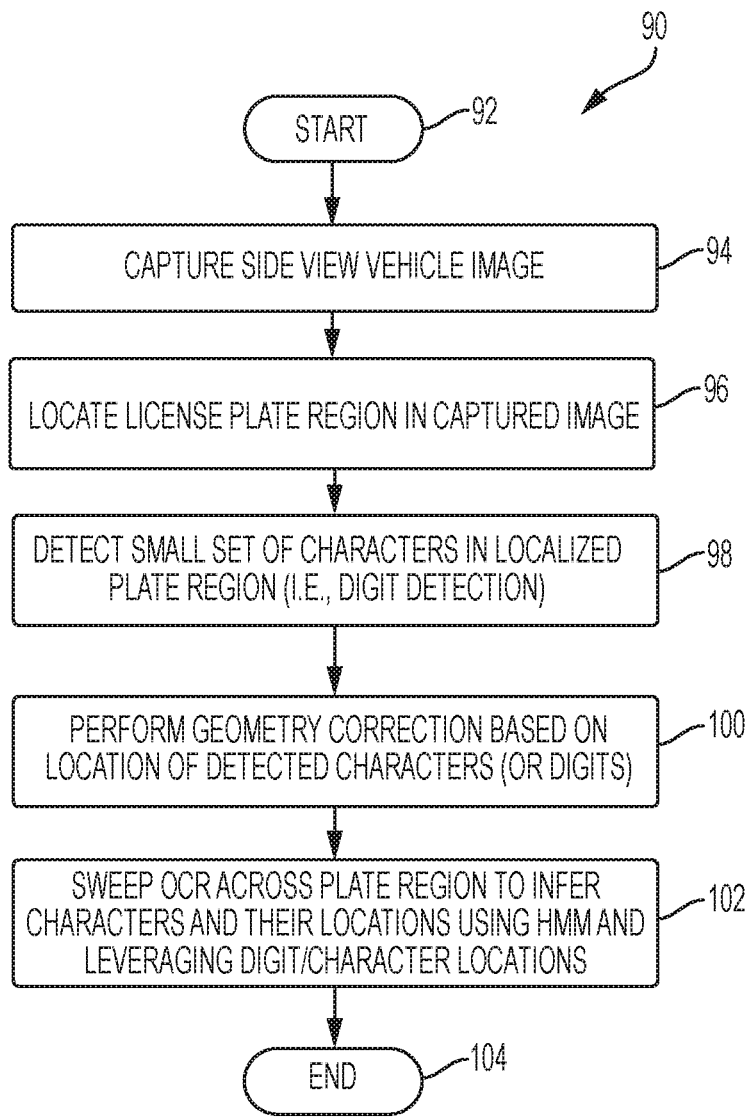
FIG. 8 illustrates a high level flow chart of operations depicting a method or detection-based segmentation-free license plate recognition, in accordance with an example embodiment.

FIG. 8 illustrates a high-level flow chart of operations depicting logical operational steps of a method 90 for detection-based segmentation-free license plate recognition, in accordance with an example embodiment. As indicated at block 92, the process begins. The method 90 can be utilized for detection-based segmentation-free ALPR for minimizing human intervention in the loop and improved performance in challenging jurisdictions where the baseline segmentation based ALPR method fails significantly due to, for example, the logo image behind the characters that makes it difficult for projective segmentation. As indicated at block 94, a step or logical operation can be implemented for capturing a vehicle image. Thereafter, as shown at block 98, a step or logical operation can be implemented for locating the license plate region in the captured image. Then, as illustrated at block 98, a step or logical operation can be implemented for detecting a small set of characters in the localized plate region (e.g., digit detection).

Thereafter, as described at block 100, a step or logical operation can be implemented for performing geometry correction based on the location of the detected characters (or digits). Finally, as depicted at block 102, a step or logical operation can be implemented for sweeping an OCR across the plate region to infer characters and their locations using HMM and leveraging anchored digit/character locations from the previous module. The process can then terminate, as shown at block 104.

Figure 9:
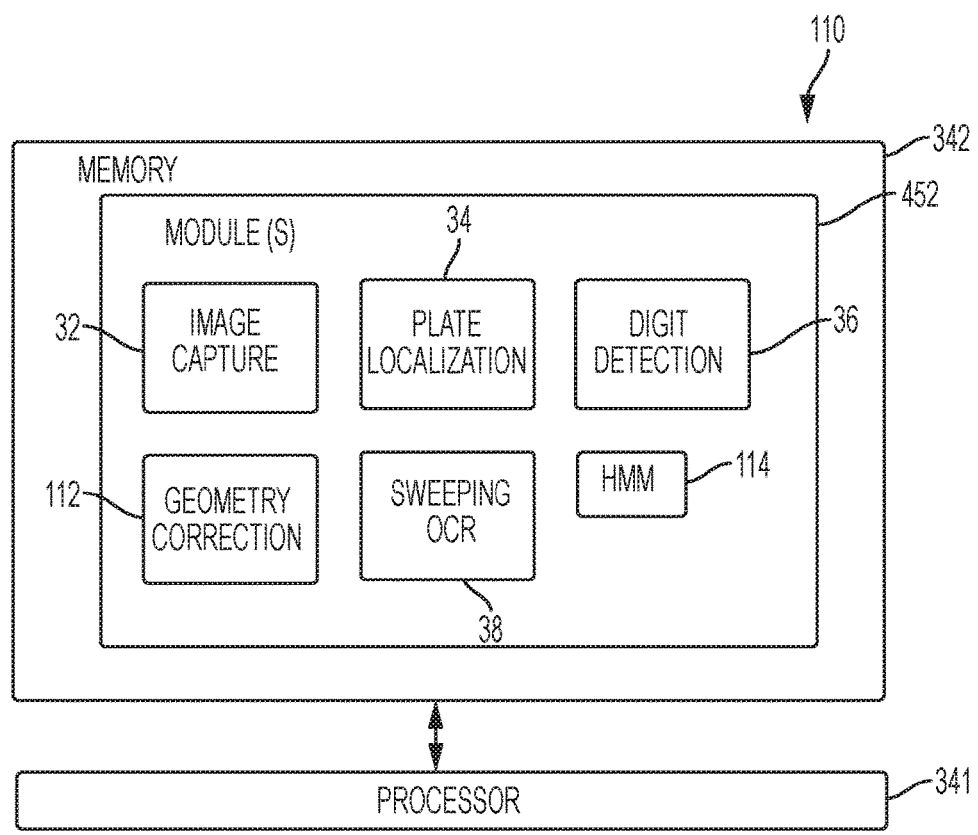
FIG. 9 illustrates a block diagram of a system for detection-based segmentation-free license plate recognition, in accordance with an example embodiment.

FIG. 9 illustrates a high-level flow chart of operations depicting logical operational steps of a system 110 for detection-based segmentation-free license plate recognition, in accordance with an example embodiment. System 110 includes a memory 342 and a processor 341, which are described in greater detail herein with respect to FIGS. 10-11. The memory 342 can store module(s) 452 composed of an image capture module 32, a plate localization module 34, a digit, detection module 36, a geometric correction module 112, a sweeping OCR module 38, and an HMM module 114. The modules 32, 34, 36, 38, 112, 114 contain instructions, which can be processed by the processor 341. The module(s) 452 depicted in FIG. 9 can implement the various steps or logical operations of method 90 shown in FIG. 8.

Figure 10:
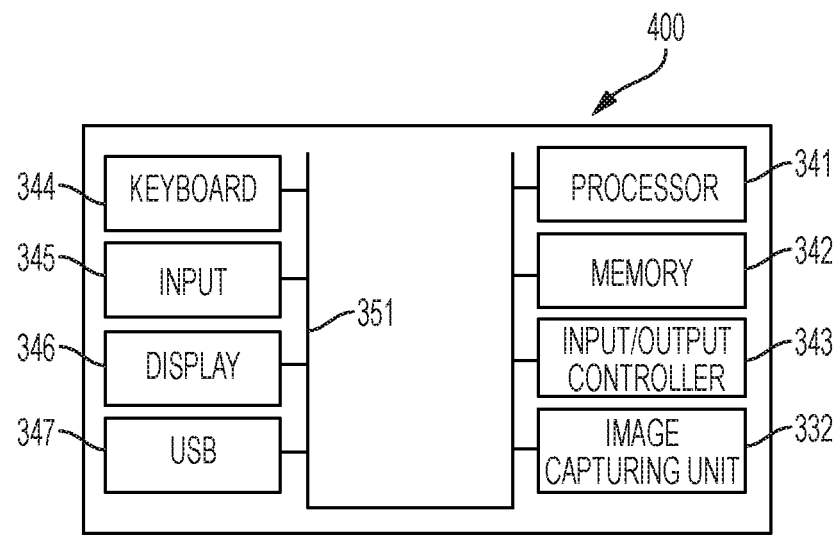
FIG. 10 illustrates a schematic view of a computer system, in accordance with an embodiment.

The image capture module 32 includes instructions for capturing a vehicle image via, for example, an image-capturing unit such as the image-capturing unit 332 (e.g., an ALPR video camera) shown in FIG. 10. The plate localization module 34 includes instructions for locating the license plate region in the captured image. The digit detection module includes instructions for detecting the small set of characters in the localized plate region (e.g., digit detection). The geometry correction module 112 includes instructions for performing geometry correction based on the location of the detected characters (or digits). Note that the geometric correction module 112 can implement instructions such as those described in FIG. 7 with respect to block 78 (i.e., geometry correction and vertical cropping). The sweeping OCR module 82 includes instructions for sweeping an OCR across the plate region to infer characters and their locations using an HMM (e.g., provided by the HMM module 114) and leveraging anchored digit/character locations from the previous module.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or, blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 11:
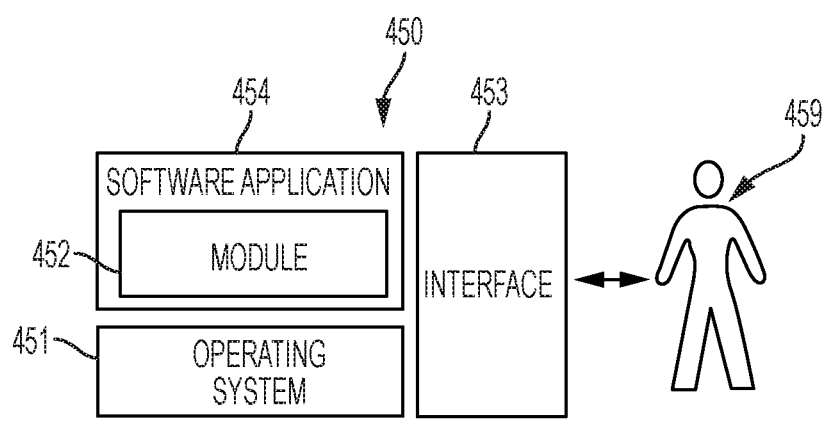
FIG. 11 illustrates a schematic view of a software system including a module, an operating system, and a user interface, in accordance with an embodiment.

FIGS. 10-11 are shown only as exemplary diagrams of data-processing environments in which embodiments may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, some embodiments may be implemented in the context of a data-processing system 400 that can include one or more processors such as the processor 341, the memory 342, an input/output controller 343, a peripheral USB—Universal Serial Bus connection 347, a keyboard 344, another input device 345 (e.g., a pointing device, such as a mouse, track ball, pen device, etc.), a display 346, and in some cases, an optional image-capturing unit 332 (e.g. a video camera) may be included with system 400 to capture images, which may then be subject to the processing instructions by provided the module 452 shown in FIG. 11 including, for example, instructions such as those described and shown herein with respect to the method 90 of FIG. 8 or the module(s) 452 shown in FIG. 9.

As illustrated, the various components of data-processing system 403 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented in some embodiments as, for example, a server in a client-server based network (e.g., the Internet) or in the context of a client and a server (i.e., where aspects are practiced on the client and the server). In yet other example embodiments, data-processing system 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi etc).

FIG. 11 illustrates a computer software system 450 for directing the operation of the data-processing system 400 depicted in FIG. 10. Software application 454 stored, for example, in memory 342 generally a module 452. The computer software system 450 further includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those of method 90 shown in FIG. 8 and discussed elsewhere herein. In some embodiments, module 452 can store modules such as modules 32, 34, 36, 112, 38, and 114 shown in FIG. 9, whose instructions are then processed by the processor 341.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 10-11 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments are disclosed. For example, in one embodiment, a detection-based segmentation-free method for license plate recognition can be implemented, which includes steps or operations such as detecting a discrete set of characters in a license plate region in an image of a vehicle; performing a geometry correction based on a location of the set of characters detected in the license plate region sweeping an OCR across the license plate region to infer detected and undetected characters in the license plate region in the image with respect to the set of characters and detected locations of the characters; and an incorporating detected character types with respect to the characters and the detected locations of the characters as a part of the sweeping the OCR. The license plate region is initially located in the image of the vehicle and the image can be captured utilizing an image-capturing unit such as, for example, the image-capturing unit 332 shown in FIG. 10.

In some example embodiments, a step or operation can be further provided for utilizing a hidden Markov model to infer the characters. The aforementioned at least one character among the set of characters can be in some example embodiments a digit. In some embodiments, the OCR may operate as a segmentation-free OCR utilizing the hidden Markov model. In still another embodiment, a step or operation can be provided for performing the geometry correction based on the location of the set of characters detected in the license plate region, further comprises: performing a vertical cropping operation with respect to the set of characters detected in the license plate region.

In another example embodiment, a detection-based segmentation-free system for license plate recognition can be provided, which includes at least one processor and a computer-usable medium embodying computer program code. The computer-usable medium is capable of communicating with the at least one processor, and the computer program code can include instructions executable by the at least one processor and configured, for example, for: detecting a discrete set of characters in a license plate region in an image of a vehicle; performing a geometry correction based on a location of the set of characters detected in the license plate region; sweeping an OCR across the license plate region to infer detected and undetected characters in the license plate region in the image with respect to the set of characters and detected locations of the characters; and incorporating detected character types with respect to the characters and the detected locations of the characters as a part of the sweeping the OCR.

In yet another example embodiment, a non-transitory processor-readable medium can store computer code representing instructions to cause a process for detection-based segmentation-free license plate recognition. Such computer can include code to, for example: detect a discrete set of characters in a license plate region in an image of a vehicle; perform a geometry correction based on a location of the set of characters detected in the license plate region; sweep an OCR across the license plate region to infer detected and undetected characters in the license plate region in the image with respect to the set of characters and detected locations of the characters; and incorporate detected character types with respect to the characters and the detected locations of the characters as a part of the sweeping the OCR.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A detection-based segmentation-free method for license plate recognition, said method comprising:
   detecting a discrete set of characters in a localized license plate region in an image of a vehicle;
   initially locating said license plate region in said image of said vehicle prior to said detecting said discrete set of characters in a localized license plate region in said image of said vehicle;
   performing a geometry correction based on a location of said set of characters detected in said localized license plate region;
   sweeping an optical character recognition (OCR) across said localized license plate region to infer detected and undetected characters in said localized license plate region in said image with respect to said set of characters and detected locations of said characters;

utilizing a HMM (hidden Markov model) to infer said characters, wherein detected digit locations in a Viterbi decoding facilitates character location in a framework of said HMM, wherein at least one character among said set of characters comprises at least one digit among a plurality of digits and wherein digit locations with respect to said plurality of digits are anchored in said sweeping OCR process and identify spacing between characters and improve decoding performance; and incorporating detected character types with respect to said characters and said detected locations of said characters as a part of said sweeping said OCR.

2. The method of claim 1 further comprising capturing said image of said vehicle with an image-capturing unit.

3. The method of claim 1 wherein said OCR comprises a segmentation-free OCR utilizing said HMM.

4. The method of claim 3 wherein said performing said geometry correction based on said location of said set of characters detected in said localized license plate region, further comprises: performing a vertical cropping operation with respect to said set of characters detected in said localized license plate region.

5. A detection-based segmentation-free system for license plate recognition, said system comprising:
at least one processor; and
a computer-usable medium embodying computer program code, said computer-usable medium capable of communicating with said at least one processor, said computer program code comprising instructions executable by said at least one processor and configured for:
capturing an image of a vehicle with an image-capturing unit;
detecting a discrete set of characters in a localized license plate region in said image of said vehicle;
initially locating said license plate region in said image of said vehicle prior to said detecting said discrete set of characters in a localized license plate region in said image of said vehicle;
performing a geometry correction based on a location of said set of characters detected in said localized license plate region;
sweeping an optical character recognition (OCR) across said localized license plate region to infer detected and undetected characters in said localized license plate region in said image with respect to said set of characters and detected locations of said characters;
utilizing a HMM (hidden Markov model) to infer said characters, wherein detected digit locations in a Viterbi decoding facilitates character location in a framework of said HMM, wherein at least one character among said set of characters comprises at least one digit among a plurality of digits and wherein digit locations with respect to said plurality of digits are anchored in said sweeping OCR process and identify spacing between characters and improve decoding performance; and incorporating detected character types with respect to said characters and said detected locations of said characters as a part of said sweeping said OCR.

6. The system of claim 5 wherein said OCR comprises a segmentation-free OCR utilizing said HMM.

7. The system of claim 6 wherein said instructions for performing said geometry correction based on said location of said set of characters detected in said localized license plate region are further configured for: performing a vertical cropping operation with respect to said set of characters detected in said localized license plate region.

8. A non-transitory processor-readable medium storing computer code representing instructions to cause a process for detection-based segmentation-free license plate recognition, said computer code comprising code to:
capture an image of a vehicle with an image-capturing unit;
detect a discrete set of characters in a localized license plate region in said image of said vehicle;
initially locate said license plate region in said image of said vehicle prior to said detecting said discrete set of characters in a localized license plate region in said image of said vehicle;
perform a geometry correction based on a location of said set of characters detected in said localized license plate region;
sweep an optical character recognition (OCR) across said localized license plate region to infer detected and undetected characters in said localized license plate region in said image with respect to said set of characters and detected locations of said characters;
utilize a HMM (hidden Markov model) to infer said characters, wherein detected digit locations in a Viterbi decoding facilitates character location in a framework of said HMM, wherein at least one character among said set of characters comprises at least one digit among a plurality of digits and wherein digit locations with respect to said plurality of digits are anchored in said sweeping OCR process and identify spacing between characters and improve decoding performance; and
incorporate detected character types with respect to said characters and said detected locations of said characters as a part of said sweeping said OCR.

9. The processor-readable medium of claim 8 wherein said OCR comprises a segmentation-free OCR utilizing said HMM.

* * * * *